(12) United States Patent
Garofola et al.

(10) Patent No.: US 7,261,060 B1
(45) Date of Patent: Aug. 28, 2007

(54) PET TRANSPORTER CONSTRUCTION DEFINING INTERIOR SPACE FOR PET

(75) Inventors: Diane Garofola, 7767 Woodmere Dr., Harrisburg, NC (US) 28075; Pete Garofola, Harrisburg, NC (US); Ian Kovacevich, Charlotte, NC (US); Daniel Lee Bizzell, Charlotte, NC (US); Kevin Dahlquist, Charlotte, NC (US); Brad Eudy, Charlotte, NC (US)

(73) Assignee: Diane Garofola, Harrisburg, NC (US)

( * ) Notice: Subject to any disclaimer, the term of this patent is extended or adjusted under 35 U.S.C. 154(b) by 0 days.

(21) Appl. No.: 11/277,517

(22) Filed: Mar. 26, 2006

(51) Int. Cl.
*A01K 1/03* (2006.01)

(52) U.S. Cl. .................. 119/496; 119/482; 280/37; 280/644; 280/647; 280/651

(58) Field of Classification Search .............. 119/482, 119/496; 280/37, 644, 647, 651, 79.11, 47.34, 280/47.371, 47.38
See application file for complete search history.

(56) References Cited

U.S. PATENT DOCUMENTS

| | | |
|---|---|---|
| 3,125,353 A | 3/1964 | Gohmann |
| 3,522,955 A | 8/1970 | Warner, Jr. |
| 3,785,344 A | 1/1974 | Patterson |
| 3,841,650 A | 10/1974 | Miskelly |
| 3,850,442 A | 11/1974 | Wehner |
| 4,139,208 A | 2/1979 | Kaley et al. |
| 4,220,345 A | 9/1980 | Johnson et al. |
| 4,266,791 A | 5/1981 | Myers |
| D273,697 S | 5/1984 | Johnson et al. |
| 4,796,909 A | 1/1989 | Kirkendall |
| 5,028,060 A | 7/1991 | Martin |
| 5,113,793 A | 5/1992 | Leader et al. |
| 5,141,241 A | 8/1992 | Avila |
| 5,243,931 A | 9/1993 | McDonough |
| 5,277,148 A | 1/1994 | Rossignol et al. |
| 5,280,767 A | 1/1994 | Goetz |
| 5,335,759 A | 8/1994 | Yeh |
| 5,467,734 A | 11/1995 | Ho |
| 5,503,424 A | 4/1996 | Agopian |
| 5,649,718 A | 7/1997 | Groglio |
| 5,701,843 A | 12/1997 | Lazides |
| 5,749,589 A | 5/1998 | Hopkins et al. |
| 5,785,003 A | 7/1998 | Jacobson et al. |
| 5,906,383 A | 5/1999 | Cortes |
| 5,941,195 A | 8/1999 | Martz |

(Continued)

*Primary Examiner*—Peter M. Poon
*Assistant Examiner*—Willie Berry, Jr.
(74) *Attorney, Agent, or Firm*—Chad D. Tillman; James D. Wright; Tillman Wright, PLLC

(57) ABSTRACT

A container of a pet transporter defines an interior space for a pet. An interior space of the container is defined by a rigid chassis including a platform bounding a bottom of said interior space, a rear panel attached to said chassis and bounding a rear of said interior space, side panels respectively attached to opposite lateral sides of said chassis and bounding sides of said interior space, and a flexible top covering that is releasably fastened, directly or indirectly, to said chassis and which, when fastened thereto, extends in a closed covering position from the rear panel to a front of said chassis thereby bounding a top of said interior space. The chassis further includes a rear support frame and two pairs of side support frames. The platform, rear support frame, and two pair of side support frames comprise a single, inseparable structure.

20 Claims, 10 Drawing Sheets

U.S. PATENT DOCUMENTS

| | | |
|---|---|---|
| 5,941,585 A | 8/1999 | McAlister, II |
| 5,988,110 A | 11/1999 | Peterson |
| 6,042,127 A | 3/2000 | Rupolo |
| 6,182,611 B1 | 2/2001 | Marchioro |
| D440,020 S | 4/2001 | Ronson et al. |
| 6,223,691 B1 * | 5/2001 | Beattie ................. 119/453 |
| 6,230,656 B1 | 5/2001 | Walach |
| 6,267,080 B1 | 7/2001 | Roy |
| D453,593 S * | 2/2002 | Licciardello ............... D30/109 |
| 6,374,775 B1 | 4/2002 | Baumsteiger |
| 6,394,036 B2 | 5/2002 | Burns et al. |
| 6,427,631 B1 | 8/2002 | Ross |
| 6,523,499 B1 | 2/2003 | Chrisco et al. |
| 6,584,937 B1 * | 7/2003 | Ludolph ................. 119/453 |
| 6,607,200 B1 | 8/2003 | Bridges |
| 6,786,181 B1 | 9/2004 | Leanheart |
| 6,896,272 B1 | 5/2005 | Burton |
| 6,913,271 B2 * | 7/2005 | Gordon ................. 280/87.01 |
| 2004/0065270 A1 | 4/2004 | King |
| 2004/0232660 A1 | 11/2004 | Chen |
| 2005/0012286 A1 | 1/2005 | Woodrow |
| 2005/0140119 A1 | 6/2005 | Wong |
| 2006/0048716 A1 | 3/2006 | Garofola |

* cited by examiner

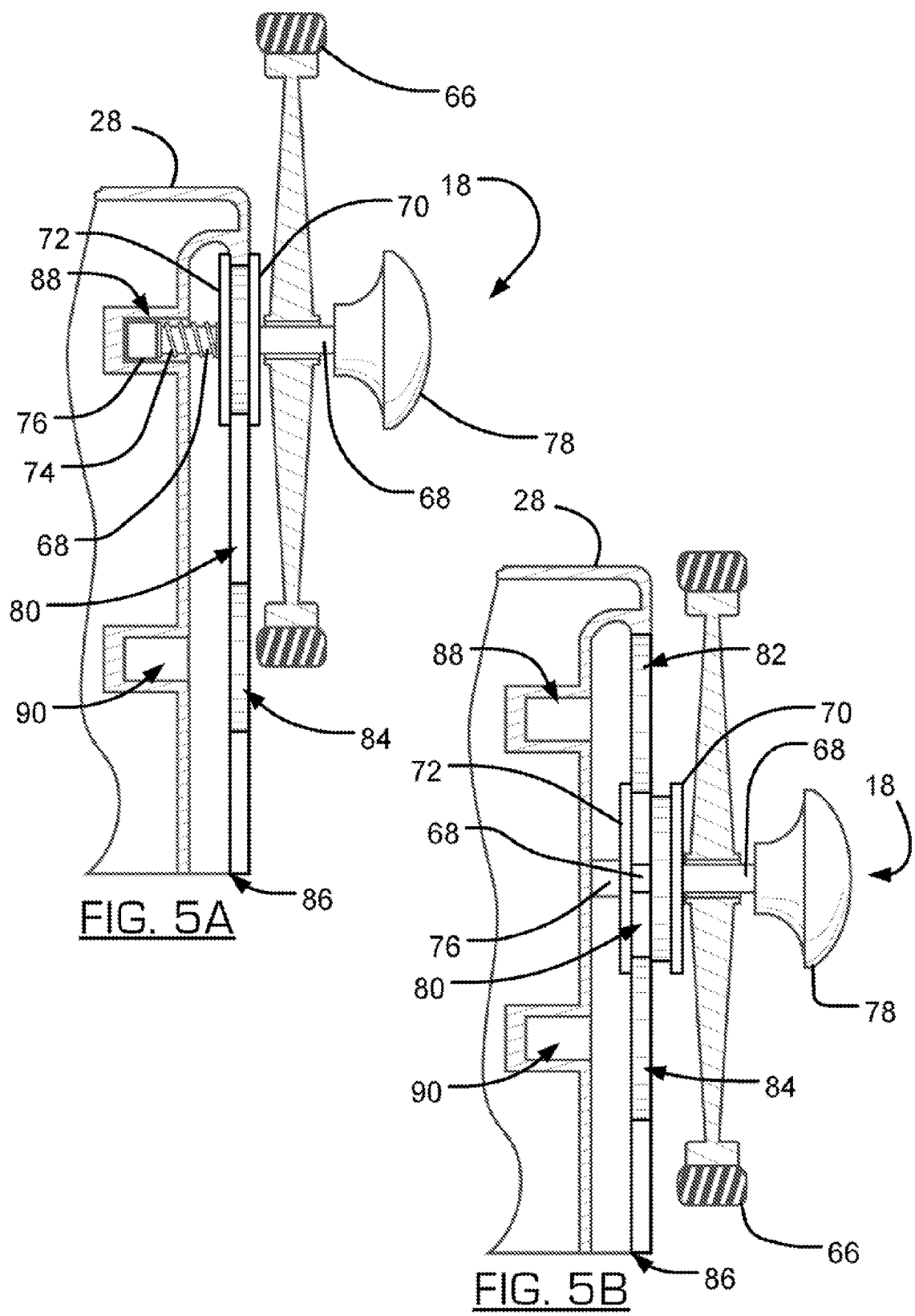

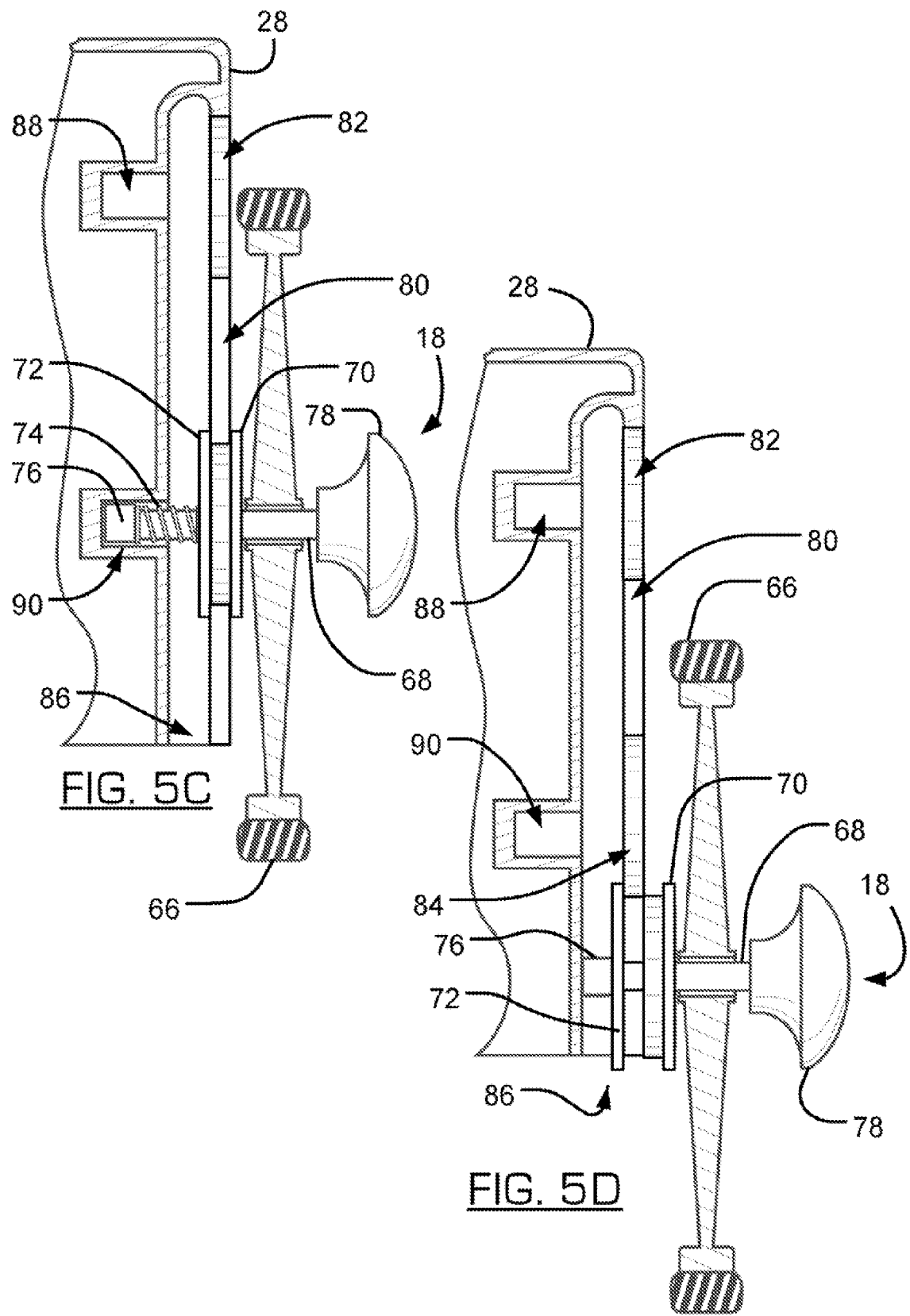

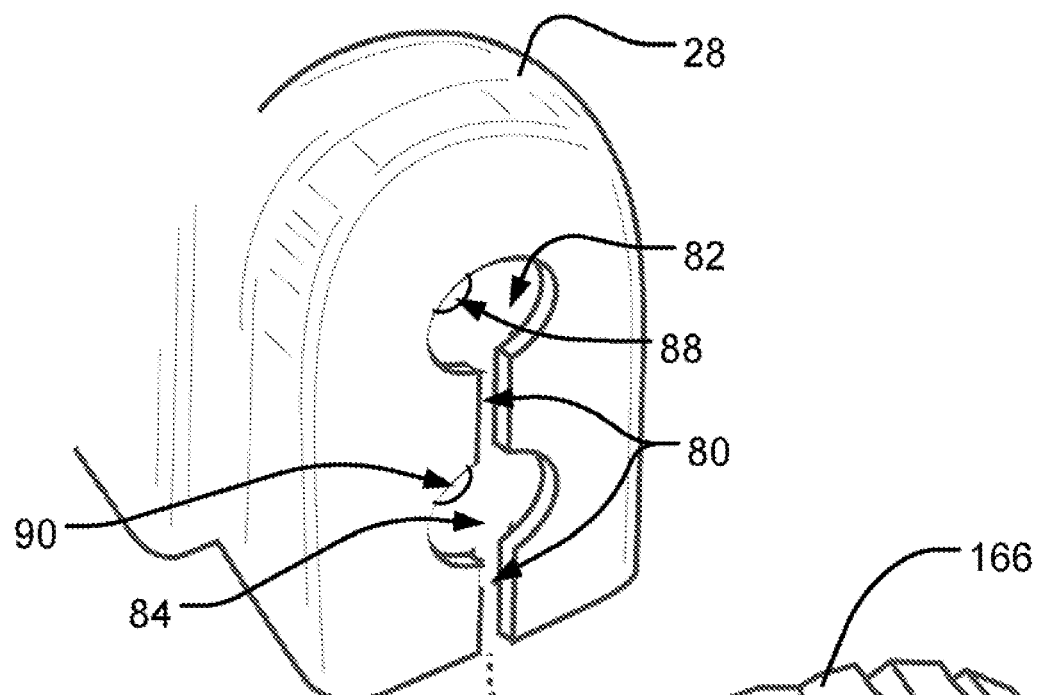
FIG. 6
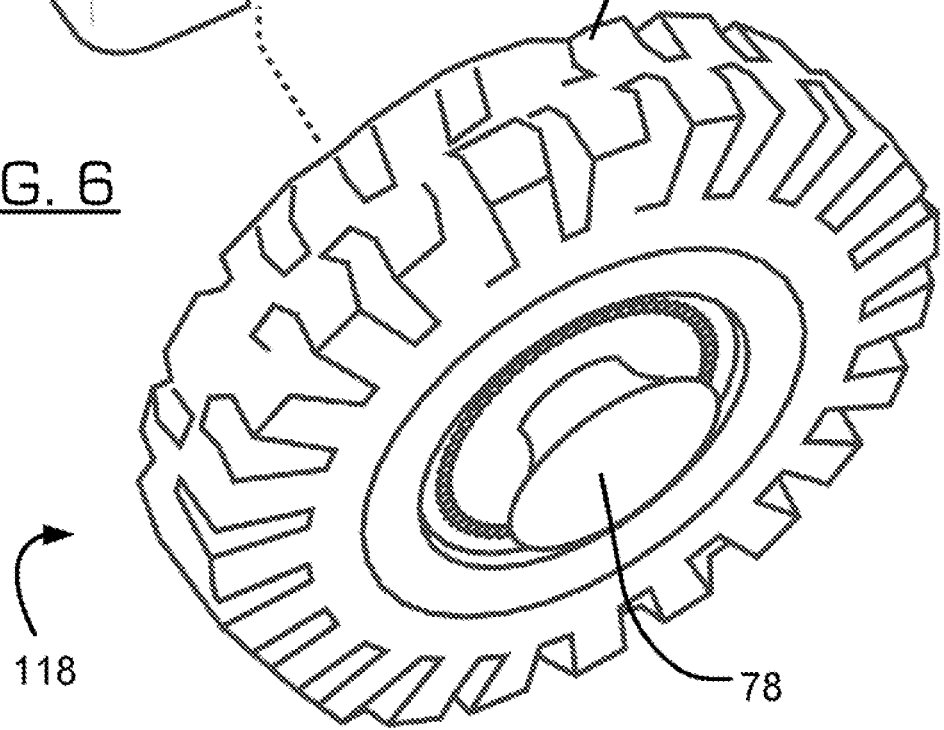

PET TRANSPORTER CONSTRUCTION DEFINING INTERIOR SPACE FOR PET

BACKGROUND

The present invention relates generally to a device for transportation of animals, and, in particular, to a carrier for a pet to be transported by both pedestrian movement and at least one of automobiles, boats and airplanes.

Large lines of stroller products are available for use with children, but are not compatible for animal use for reasons such as body shape and size. Animal transportation devices, to be most versatile, must be adaptable to land, sea and air travel, while additionally being suitable for pedestrian walks. It is difficult to create one mobile animal carrier to adapt to all variations of these transportation types.

Several approaches have been taken to create suitable devices for animal transportation. One such approach is disclosed in concurrently pending U.S. patent application Ser. No. 10/936,300, filed Sep. 8, 2004, which published as U.S. patent application publication no. 2006/0048716 A1, each of which is incorporated herein by reference.

While several approaches have been taken, it is believed that a need continues to exist for yet another convenient device for transportation of animals, and, in particular, to a mobile carrier for a pet to be transported by pedestrian movement as well as by at least one of automobiles, boats and airplanes.

SUMMARY OF THE INVENTION

Broadly defined, the present invention comprises a device for transportation of animals. In preferred embodiments, a pet transporter is provided for transportation of a pet by both pedestrian movement and at least one of automobiles, boats and airplanes.

A pet transporter includes a container dimensioned to receive a pet therein and wheel assemblies each attached to said container, each said wheel assembly including a wheel for vehicular rolling of the container over a surface.

In accordance with an aspect of the invention, each said wheel assembly is selectively detachable from said container independent of the detachment of any of the other said wheel assemblies. Furthermore, each wheel assembly includes a respective wheel and axle. Said wheel is rotatable about an axis of said axle, and an end of said axle longitudinally extends from exterior of said container, through an opening of said container, to within said container when said wheel assembly is attached to said container. Said wheel assembly and, in particular, said axle, preferably is anchored to said portion of said container that defines said opening and is anchored at an end thereof that is received within a receptacle of said container. Moreover, the portion of the container defining the opening and the receptacle preferably are spaced apart, with the axle spanning a gap there between. Each wheel assembly also preferably includes a spring component that urges said wheel assembly into clamping engagement with said container when said wheel assembly is attached to said container.

In accordance with another aspect of the invention, each said wheel assembly is configured to be selectively detached and reattached to said container between a retracted position, whereat said wheel of said wheel assembly is not configured to engage the surface for vehicular rolling of said container, and an extended position, whereat said wheel of said wheel assembly is configured to engage said surface for vehicular rolling of said container.

In accordance with a third aspect of the invention, the container defines an interior space in which the pet is received. This interior space is defined by: a chassis that includes a platform enclosing (i.e., bounding) a bottom of said interior space; a rear panel attached to said chassis to enclose (i.e., bound) a rear of said interior space; side panels respectively attached to opposite lateral sides of said chassis to enclose sides of said interior space; and a flexible top covering that is releasably fastened directly or indirectly, preferably by zippers, to said chassis and which, when fastened to said chassis, extends in a closed covering position from said rear panel to a front of said chassis thereby bounding a top of said interior space.

In accordance with a fourth aspect of the invention, the container includes a chassis that, itself, comprises a platform, a rear support frame extending upwardly from said platform, and two pairs of side support frames located on opposite lateral sides of said chassis, each said side frame extending from said rear support frame of said chassis to a front or forward portion of said platform. Furthermore, said platform, said rear support frame, and said two pair of said support frames comprise a single, inseparable structure. In this respect, said platform, said rear support frame, and said two pair of said support frames preferably are integrally formed in one or more molding processes.

In features of the invention: a said wheel assembly comprises a self-contained assembly that includes a wheel and an axle; a said wheel assembly comprises a spring-biased component for locking engagement of said wheel assembly with said container; each said attachment of said wheel assembly to said container comprises a snap-on attachment; a pair of said wheel assemblies respectively extend outwardly from opposite lateral sides of said container such that said container is disposed laterally between said wheels of said wheel assemblies; and said container defines an enclosed interior space in which the pet is received and retained during transportation.

In another feature of the invention, said container comprises a front loading ramp that is configured for pivotal movement between a raised position and a lowered position for entrance into and exit from said container by a pet. With respect to this feature, said loading ramp, when disposed in said lowered position, preferably is either disposed level with a floor of said container or below, and oriented at an incline to, the floor of said container. The loading ramp also may be secured in said raised position by a latch. The loading ramp also may constitute a front wall of said container that encloses a pet when the loading ramp is in said raised position. In another feature of the invention, a front wall may enclose a front of an interior space of said container for receiving the pet. The front wall may comprises the front loading ramp.

In another feature, said loading ramp includes a handle. Said handle preferably is located near a hinged connection of said loading ramp to said chassis of said container such that said handle does not interfere with the lowering of said loading ramp into said lowered position for entrance into and exit from said container by a pet. Said container also preferably comprises a second handle that is located in back of said container such that said handle of said loading ramp and said second handle may be used for stable, level lifting of said container while a pet is enclosed therein. Said second handle is preferably located at the top of the back of said container.

In still yet another feature, the pet transporter includes a handle. The handle may be a telescopic handle that is attached to said container, and the telescopic handle may be configured to bow away from said container when the telescoping sections of the handle are extended. Alternatively, the handle may be integrally formed with a chassis of said container and, preferably as part of the rear support frame of the chassis.

In another feature of the invention, the pet transporter further comprises a pet restraint system adapted for releasable attachment of a leash. The pet restraint system may include a leash that is releasably attached to said container and that includes a spring-loaded hook for attachment to a pet collar or, preferably, harness.

In still yet another feature of the invention, an interior space of said container completely encloses a pet when received in the pet carrier. The interior space of said container further may be defined by a pair of additional side panels respectively extending along opposite lateral sides of said chassis to enclose sides of said interior space.

In other features of the invention, the chassis may comprise a rigid chassis and the top covering may comprise flexible that is adapted to be rolled up and that may include springs for self-rolling of the top covering when unfastened. In still yet another feature, said chassis may comprise a molded chassis and may be formed from one or more molding processes, such as, for example, injection molding, blow molding, and rotational molding.

In another feature, side panels may include apertures for ventilation and air circulation of said interior space of said container. The side panels may each comprises, for example, a mesh material. Similarly, in another feature, the top covering may include apertures for ventilation and air circulation of said container and may include comprise a mesh material.

In yet another feature, each pair of said side frames comprises an upper side frame and a lower side frame. Each said side frame further may continuously slope downwardly in extending from said rear side frame to said front of said chassis, thereby defining the sloping, pod-like profile of the pet transporter.

In another feature, said platform, said rear support frame, and said two pair of side support frames are integrally formed in one or more molding processes. Said container also further may include a side panel that is integrally formed with said platform, said rear support frame, and said two pair of side support frames in one or more molding processes.

Other aspects of the invention include methods of transporting pets using pet transporters in accordance with the foregoing aspects and features of the invention.

In addition to the aforementioned aspects and features of the present invention, it should be noted that the present invention further includes the various possible combinations of such aspects and features. Examples of such combinations are illustrated in the detailed description set forth below.

BRIEF DESCRIPTION OF THE DRAWINGS

Further features, embodiments, and advantages of the present invention will become apparent from the following detailed description with reference to the drawings, wherein:

FIGS. 5A–5E are partial cross-sectional views of the wheel mount and wheel assembly of FIGS. 1–4 in various positions relative to each other.

FIG. 6 is a perspective view of a wheel mount and another wheel assembly in accordance with another embodiment of the present invention.

DETAILED DESCRIPTION

Figure 1:
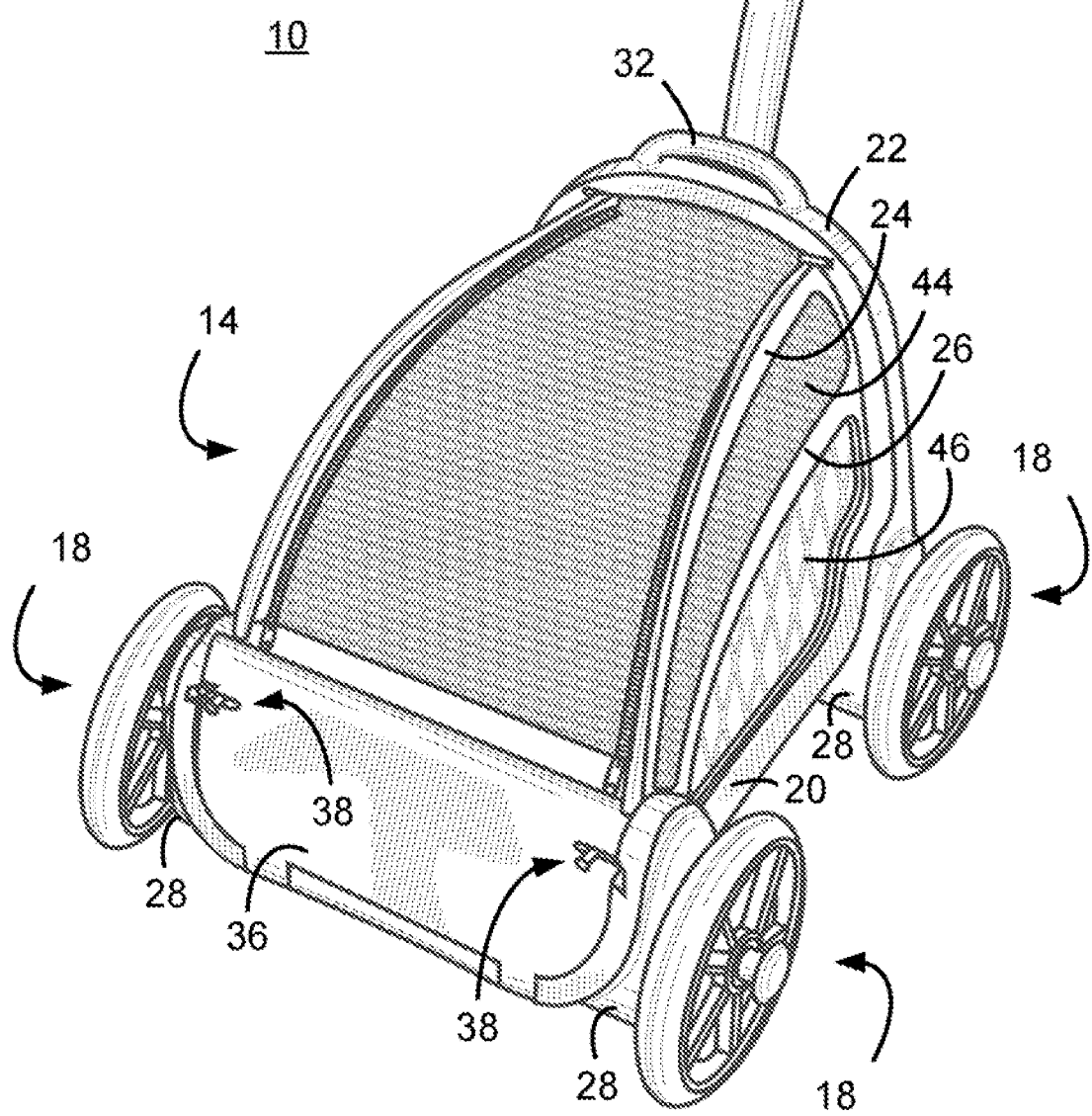
FIG. 1 is a perspective front view of a pet transporter showing a loading ramp in a raised position, a telescopic handle in an extended position, and a covering zipped into a closed position, all in accordance with an embodiment of the present invention.

As a preliminary matter, it will readily be understood by one having ordinary skill in the relevant art ("Ordinary Artisan") that the present invention has broad utility and application. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, a pet transporter in accordance with one or more preferred embodiments of the present invention are described. Furthermore, the following description is merely exemplary in nature and is in no way intended to limit the invention, its application, or uses.

Turning now to FIGS. 1–4, a pet transporter in accordance with a preferred embodiment of the present invention is illustrated and generally designated by reference numeral 10. The pet transporter 10 generally comprises a container 14, a handle assembly 16, and four wheel assemblies 18. Furthermore, the materials from which the pet transporter 10 is made preferably are highly durable and washable.

The Container of the Pet Transporter

The container 14 itself comprises a chassis that, preferably, is manufactured from a durable plastic material in one or more molding processes. The chassis includes, as part thereof: a platform 20, to which selectively attach the four wheel assemblies 18; a rear frame 22; and side frames including upper side frames 24 and lower side frames 26. The chassis is dimensioned to enclose a small pet, such as a dog or a cat.

The platform 20 includes four wheel mounts 28 to each of which a respective one of the wheel assemblies 18 is selectively attached. The wheel mount 28 and wheel assemblies 18 are described in greater detail below with reference to FIGS. 5A–5E. The platform 20 also includes a floor surface 30 upon which the pet is supported. The floor surface 30 may be ribbed or otherwise contoured to provide slip-resistant support of a pet during transport of the pet transporter 10.

Figure 2:
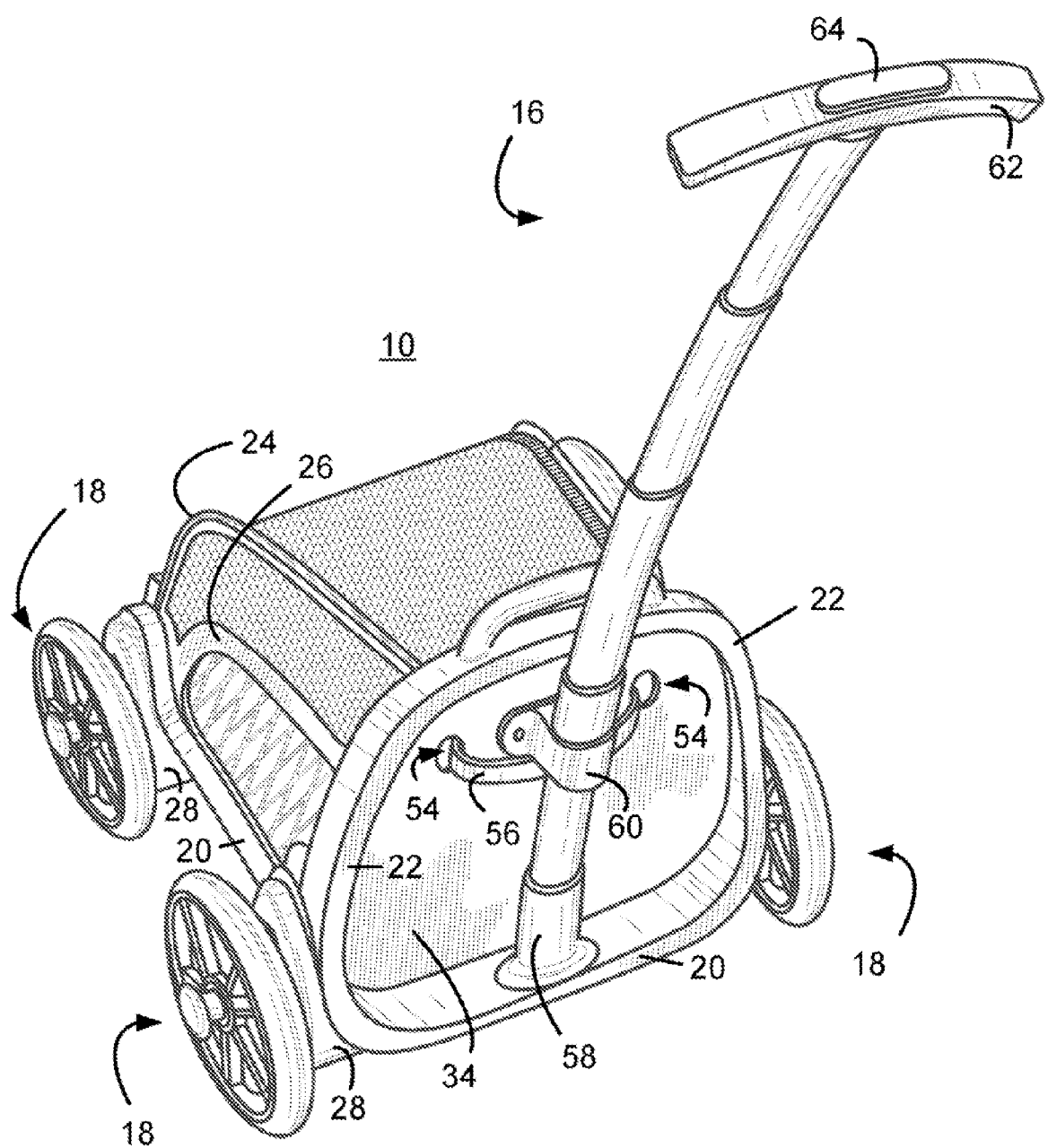
FIG. 2 is a perspective rear view of the pet transporter of FIG. 1.

As best shown in FIG. 2, the rear frame 22 comprises an arch that extends upward from and connects the opposite sides of the rear of the platform 20. The top of the rear frame 22 further includes, integral therewith, a rear handle 32. A back panel 34 is attached to and supported by the platform 20 and the rear frame 22, and the back panel 34 serves to cover the opening that would otherwise be defined by the arch of the rear frame 22.

As noted previously, the chassis includes an upper side frame 24 and a lower side frame 26. The upper side frame 24 extends between a side portion of the rear frame 22 and a side portion of the front of the platform 20. Similarly, the lower side frame 26 extends between a side portion of the rear frame 22 and a side portion of the front of the platform 20. The side portion of the rear frame 22 from which the lower side frame 26 extends is located at an elevation lower than the side portion of the rear frame 22 from which the upper side frame 24 extends. Similarly, the side portion of the front of the platform 20 to which the upper side frame 24 extends is located at a position further forward than that of the side portion of the front of the platform 20 to which the lower side frame 26 extends. Moreover, in extending from the rear side frame 22 toward the front portion of the platform 20, each of the upper side frame 24 and lower side frame 26 preferably continuously slopes downwardly.

The upper side frame 24 and lower side frame 26 on each side of the container 20 comprise the support structure of the respective side wall of the container 14. In this regard, a first side panel 44 extends between the upper side frame 24 and the lower side frame 26 and covers the opening that would otherwise be defined between the two side frames 24,26. Similarly, a second side panel 46 extends between the lower side frame and the platform 20 and covers the opening that would otherwise be defined between the lower side frames 26 and the platform 20.

Each of the first and second panels 44,46 may include apertures for ventilation and air circulation within the pet transporter. The apertures of one or both of the panels 44,46 further may be dimensioned to permit the pet to see there through. For instance, the first panel 44 may comprise a woven screen mesh that is permanently attached to the chassis, and the second panel 46 may comprise a lattice that is integrally formed during the one or more chassis manufacturing processes. In this case, preferably the apertures of the lattice would permit the pet to be viewed within the pet transporter 10, and the apertures of the woven screen mesh would permit the pet to view the area outside of the pet transporter 10 but would not permit the pet to be viewed within the pet transporter 10.

Figure 4:
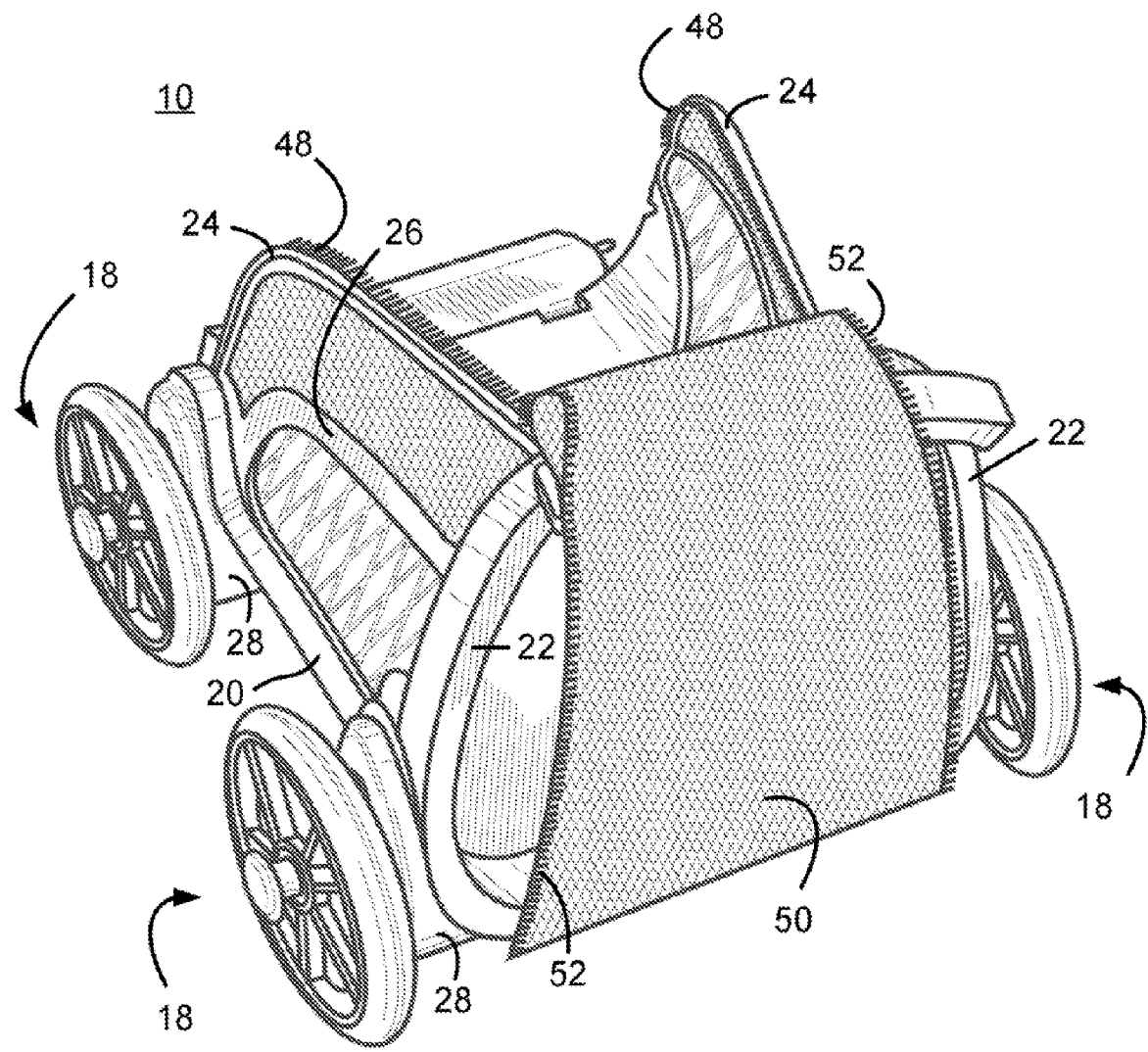
FIG. 4 is a perspective rear view of the pet transporter of FIG. 3.

As best illustrated in FIG. 4, the upper side frame 24 on each side of the pet transporter 10 also includes a first zipper element 48. The container 14 also includes a top covering 50 having correspondingly-located second zipper elements 52 that mate with the first zipper elements 48. The covering 50 is flexible and, when unzipped, may be rolled over the back of the pet transporter 10 as illustrated in FIG. 4. Alternatively, the covering 50 may be rolled-up into itself and, to facilitate this, the covering 50 may include springs (not shown) positioned along the length thereof parallel to each of the zipper elements 52. The covering 50 also may be secured in a rolled configuration on top of, and near the back of, the top of the container 14 by fasteners (not shown), such as hook-and-loop fasteners. Furthermore, like the side panels 46, the covering 50 may comprise a woven screen mesh having apertures that permit the pet to view the area outside of the pet transporter 10 but that do not permit the pet to be viewed within the pet transporter 10.

Figure 3:
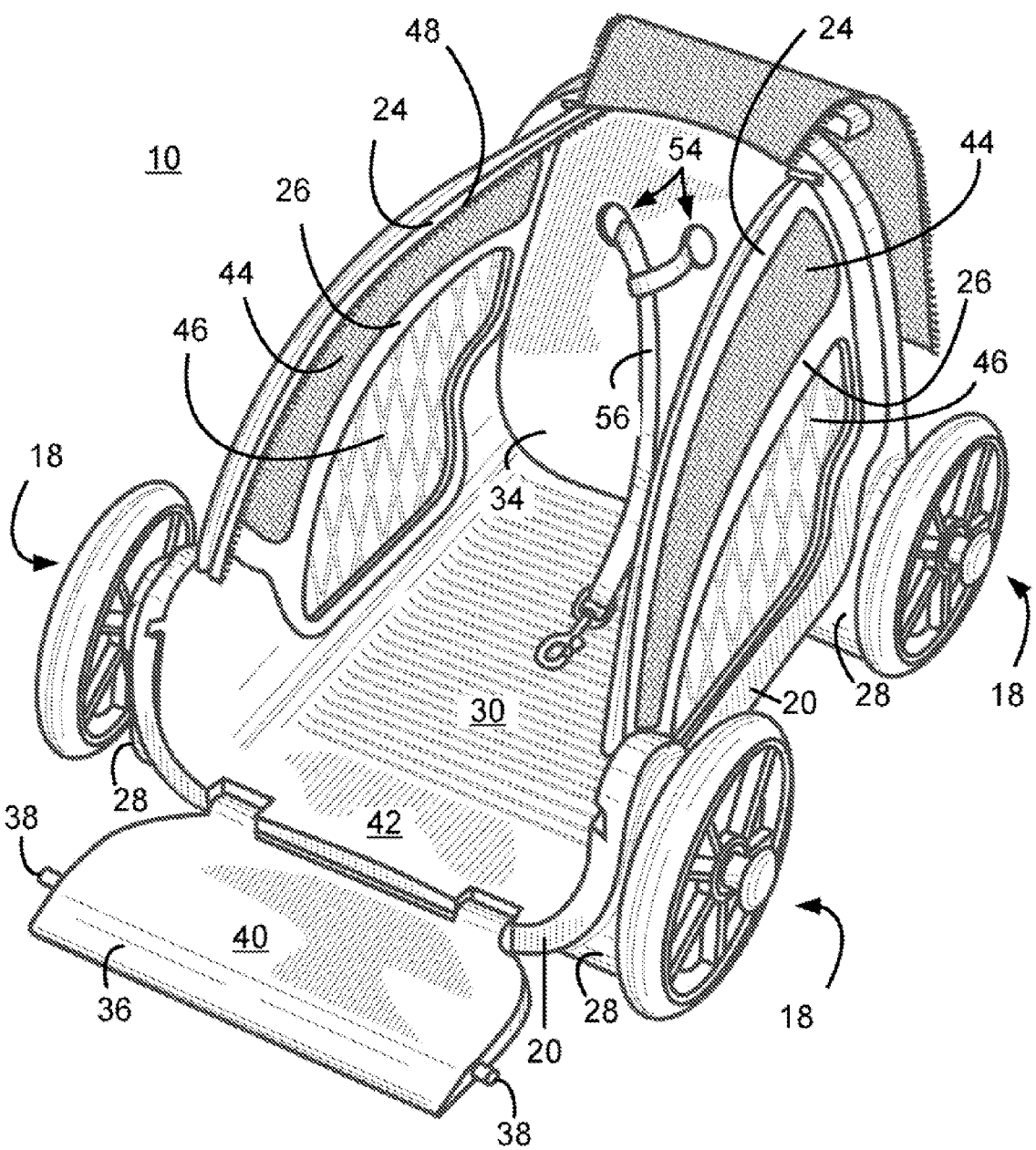
FIG. 3 is another perspective front view of the pet transporter of FIG. 1 showing the loading ramp in a lowered position, the telescopic handle in a retracted position, and a covering unzipped into an open position revealing therein a leash restraint for a pet.

The container 14 also includes a loading ramp 36 that is attached to a front portion of the platform 20 through a hinged connection. The loading ramp 36 is thereby capable of movement between a raised position (as shown in FIGS. 1 and 2) and a lowered position (as shown in FIGS. 3 and 4). When in the raised position, the loading ramp 36 defines a front wall of the container 14 and serves to enclose and contain the pet within the pet transporter 10. Spring-loaded latches 38 secure the loading ramp 36 in the raised position. Conversely, a pet may enter into or exit from the container 14 via the loading ramp 36 when disposed in the lowered position. Moreover, the loading ramp 36 includes a range of motion such that, when fully lowered, an inner wall surface 40 of the loading ramp 36 preferably is disposed at an angle greater than 180 degrees relative to a top surface 42 of the floor of the platform 20, whereby the loading ramp 36 is inclined relative to the floor of the platform 20.

The back panel 34, which is attached to and supported by the platform 20 and the rear frame 22, and which serves to cover the opening that would otherwise be defined by the arch of the rear frame 22, includes two openings 54 through which a leash 56 may extend as shown. In particular, the leash 56 may be a conventional leash that includes a looped end and an opposite end having a spring-biased self-locking hook. The leash 56 is threaded through the openings 54 and the non-looped end of the leash 56 is passed through the looped end. The non-looped end then may be attached to a conventional collar or, preferably, harness of a pet. Because the non-looped end of the leash is threaded through the looped end, and because the leash itself 56 is threaded through the openings 54, the pet is thereby tethered to the rear panel 22 and suitably restrained within the container 14 of the pet transporter 10.

The openings 54 and leash 56 constitute a leash restraint system. Such a leash restraint system may be provided to enhance security and safety of a pet during transportation of the pet within the container 14 of the pet transporter 10.

The Handle of the Pet Transporter

In addition to the container 14, the pet transporter further comprises a handle 16. The handle 16 preferably comprises a telescoping handle, wherein the handle 16 preferably is movable between an extended position and a retracted position. A base 58 (FIG. 2) of the handle 16 is mounted onto the platform 20 of the container 14. The handle 16 also is secured to the back panel 34 of the container 14 via a U-shaped bracket 60 for additional security in the mounting.

As the handle 16 is extended, the handle 16 also is configured to bow away from the pet container 14 for easier handling during pushing and pulling of the pet transporter 10. This bowing is achieved due to the curved configuration of each of the telescoping sections of the handle 16.

The top of the handle 16 includes a T-bar grip 62 for pushing and/or pulling of the pet transporter 10 using the handle 16. The T-bar grip 62 includes a push button 64 for lowering and raising of the T-bar grip 62 to a desired height for pushing and/or pulling of the pet transporter 10 using the handle 16. In this respect, the T-bar grip 62 preferably is locked in position when the handle 16 is extended, and the push-button 64 preferably releases the locking mechanism for lowering or raising of the T-bar grip 62. The particular construction of the T-bar grip 62 and push button 64 may resemble the construction of grips and push buttons found in the handles of conventional wheeled suitcases. In an alternative, the handle may comprise a dual-telescoping style handle (not shown) that also is similar in construction to conventional handles utilized in wheeled luggage.

The Wheel Assemblies of the Pet Transporter

In addition to the container 14 and the handle 16, the pet transporter further comprises wheel assemblies 18. In particular, the pet transporter 10 includes four wheel assemblies 18, and a respective wheel assembly is located proximate each of four corners of the platform 20 of the container 14. In this regard, each of the wheel assemblies 18 is received within a respective wheel mount 28 that is integral with and defined by the platform 20.

In accordance with a feature of the present invention, each of the wheel assemblies 18 is selectively attachable to the platform 20 at a respective wheel mount 28. Thus, a wheel assembly 18 may be attached to platform 20 at a respective wheel mount 28, as illustrated in FIGS. 5A and 5C, or completely detached from the platform 20, as illustrated in FIG. 5E.

In accordance with another feature of the present invention, each of the wheel assemblies 18 is selectively attached to the platform 20 at a respective wheel mount 28 at different respective elevations relative to the platform 20. In this respect, a wheel assembly 18 may be selectively attached to the wheel mount 28: at a first, extended position such that a wheel 66 of the wheel assembly 18 extends below the platform 20 for engagement with the ground; and at a second, retracted position such that the wheel 66 of the wheel assembly 18 does not extend below the platform 20 and, thus, does not engage the ground.

Figure 5E:
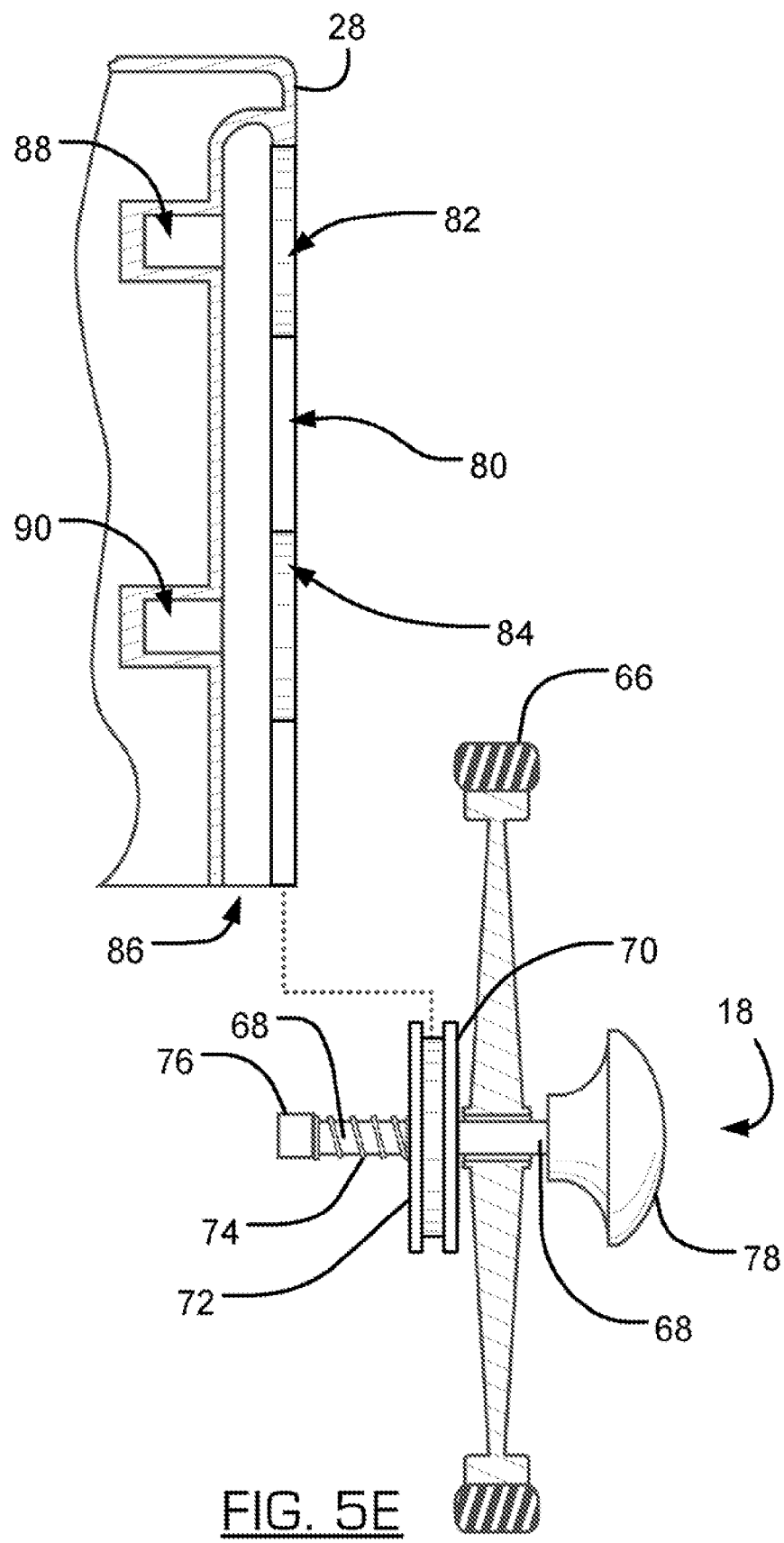
Figure 7:
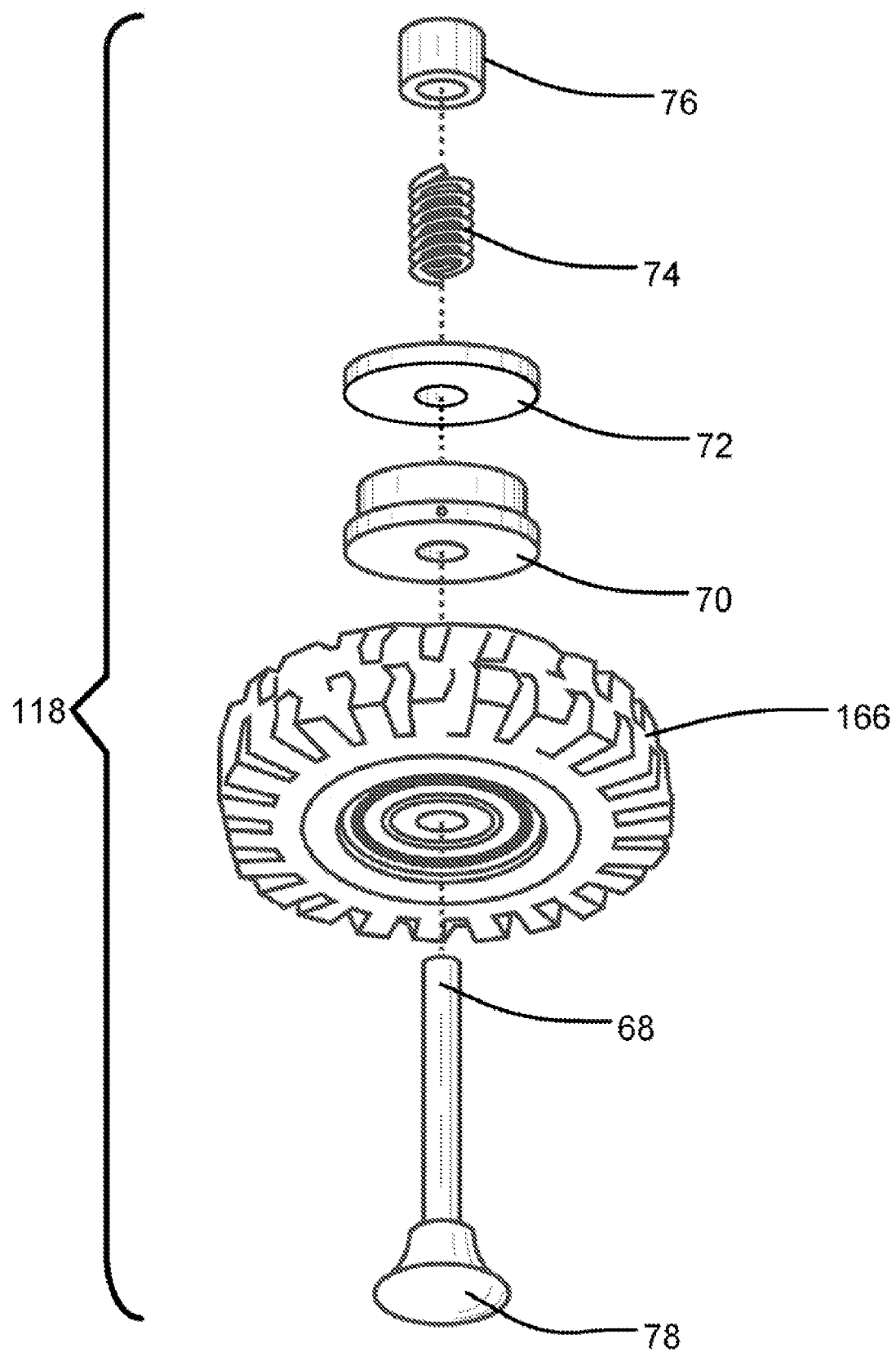
FIG. 7 is an exploded view of the wheel assembly of FIG. 6.

Indeed, with reference to FIGS. 5A–5E, a representative wheel mount 28 and a representative wheel assembly 18 are shown in various positions relative to one another. Of course, other wheel mounts and wheel assemblies will likewise be apparent to the Ordinary Artisan. In FIG. 5A, the wheel assembly 18 is illustrated in the retracted position. As shown, the wheel 66 of the wheel assembly 18 is located above the bottom of the platform 20, which defines the wheel mount 28. In this particular position, the wheel 66 will not engage the ground when the pet transporter 10 is placed upon the ground.

Conversely, in FIG. 5C, the wheel assembly 18 is illustrated in the extended position. As shown, the wheel 66 of the wheel assembly 18 is located such that a lower portion of the wheel 66 extends below the bottom of the platform 20 defining the wheel mount 28. In this particular position, the wheel 66 will engage the ground when the pet transporter 10 is placed upon the ground.

As shown in FIGS. 5A–5E, the wheel assembly 18 includes, besides the wheel 66: an axle 68; two circular grommets 70,72; a coiled spring 74; a spring retainer 76; and a knob 78. The wheel 66 is disposed on the axle 68 for rotational movement about an axis thereof. The two circular grommets 70,72 and coil spring 74 also are disposed on the axle 68. The circular grommet 70 is mounted in fixed disposition on the axle 68, and each of the circular grommet 72 and coil spring 74 are mounted for sliding movement relative to the axle 68 in the direction of the axis thereof. Furthermore, the grommets 70,72 are disposed between the wheel 66 and the coil spring 74. The coiled spring 74 is retained on the axle 68 by the spring retainer 76, which preferably is fixedly mounted to a terminal end of the axle 68. The spring retainer 76 retains the coil spring 74 in a compressed state in abutment with the spring retainer 76 and the circular grommet 72. The knob 78 is mounted on the other terminal end of the axle 68 in fixed disposition relative to the axle 68.

The wheel mount 28 is configured to receive the wheel assembly 18 in locking engagement in each of the retracted and extended positions. The wheel mount 28 includes a flanged slot 80 with two circular openings 82,84. The slot 80 includes an open-end 86 at the bottom of the platform 20. The wheel mount 28 further includes a respective receptacle in the form of a cylindrical cavity 88,90 located opposite to, and coaxial with, each circular opening 82,84.

When the wheel assembly 18 is disposed in the retracted position, as illustrated in FIG. 5A, the spring retainer 76 is received within cylindrical cavity 88 and provides an anchor point for the terminal end of the axle 68. In this disposition, the spring retainer 76 maintains the coil spring 74 in a compressed state in which it biases the circular grommet 72 into abutment with the inside surface of the flanged slot 80. The coil spring 74 likewise keeps the spring retainer 76 firmly seated within the cylindrical cavity 88. In this disposition, the other circular grommet 70 is received within the first circular opening 82 and abuts the circular grommet 72.

Moreover, the diameter of the circular grommet 70 is sized to fit snugly within the circular opening 82, thereby providing a second anchor point for the axle 68. With the axle 68 secured into position, the wheel 66 rotates about the axle 68 without any instability.

In transitioning between the retracted position of FIG. 5A and the extended position of FIG. 5C, the knob 78 is pulled along the axis of the axle 68 in a direction away from the wheel mount 28. This pulling of the knob 78 counteracts the spring force from the coil spring 74 and permits the spring retainer 76 and the end of the axle 68 to be withdrawn from the cylindrical cavity 88. The circular grommet 70, which is mounted in fixed disposition on the axle 68, also is withdrawn from the circular opening 82. In this disposition, the wheel assembly 18 then is free to slide along the flanged slot 80 downward toward the second circular opening 84 and second cylindrical cavity 90, as shown in FIG. 5C.

When the wheel assembly 18 is disposed in the extended position, as illustrated in FIG. 5C, the spring retainer 76 is received within cylindrical cavity 90 and provides an anchor point for the terminal end of the axle 68. In this disposition, the spring retainer 76 maintains the coil spring 74 in a compressed state in which it biases the circular grommet 72 into abutment with the inside surface of the flanged slot 80. The coil spring 74 likewise keeps the spring retainer 76 firmly seated within the cylindrical cavity 90. In this disposition, the other circular grommet 70 is received within the second circular opening 84 and abuts the circular grommet 72. Moreover, the diameter of the circular grommet 70 is sized to fit snugly within the circular opening 84, thereby providing a second anchor point for the axle 68. With the axle 68 secured into position, the wheel 66 rotates about the axle 68 without any instability.

The wheel assembly 18 further may be completely detached from the wheel mount 28, as illustrated in FIG. 5E. In transitioning from the extended position of FIG. 5C to the detached position of FIG. 5E, the knob 78 is pulled along the axis of the axle 68 in a direction away from the wheel mount 28. This pulling of the knob 78 counteracts the spring force from the coil spring 74 and permits the spring retainer 76 and the end of the axle 68 to be withdrawn from the cylindrical cavity 90. The circular grommet 70, which is mounted in fixed disposition on the axle 68, also is withdrawn from the circular opening 84. In this disposition, the wheel assembly 18 then is free to slide downward along the flanged slot 80 and out of the open-end 86 at the bottom of the platform 20. Of course, a blocking member (not shown) may be removably inserted into, or otherwise removably affixed in position relative to, the open-end 86 for inhibiting accidental withdrawal of the wheel assembly 18 from the flanged slot 80 when not intended.

Use of the Pet Transporter

In operation, the pet transporter 10 can be used to transport a pet via pedestrian movement by pushing and pulling of the pet transporter 10 like a baby stroller, and can be used to transport a pet within an automobile, plane, or boat.

In this regard, when all four wheel assemblies, such as the representative wheel assemblies 18 for example, are in the extended position and the handle 16 is in an extended position, the pet transporter 10 can be rolled and steered by pushing and pulling on the handle 16. This makes the pet transporter 10 readily usable in combination with pedestrian movement, such as walking and strolling.

Conversely, when all four wheel assemblies 18 are in the retracted position and the handle 16 is in the retracted position, the pet transporter 10 is very efficient in its space utilization and can readily be placed on the seat of an automobile, plane, or boat, and in some instances, under the seat of the automobile, plane, or boat. Moreover, removal of the wheel assemblies 18 increases the ease with which the pet transporter 10 may be carried and stored, either with or without a pet contained therein. In either case, the integral rear handle 32 facilitates lifting of the pet transporter 10 with or without a pet contained therein. An additional handle (not shown) further may be provided as part of the loading ramp 36 for simultaneous gripping and lifting of the pet transporter 10 with or without a pet contained therein.

For the safety of the pet, when the pet transporter 10 is used to transport a pet in an automobile, plane, or boat, a seat belt (if available) preferably is passed between the rear panel 22 and the handle 16 and retains the pet transporter 10 in the event of a sudden stop or other sudden motion.

When placing the pet into the container 14, the loading ramp 36 preferably is lowered and the top covering 50 is rolled back. The pet may be retained within the container by: securing the leash 56 to a collar or, preferably, harness of the pet; and/or simply securing the loading ramp 36 into the raised position and zipping the top covering 50 so that its zipper elements 52 fully engage the zipper elements 48 of the upper side frames 24 and so that the top covering 50 extends proximate to the top of the loading ramp 36. The loading ramp 36 and top covering 50 thereby collective serve to restrain a pet within the container 14, although the leash 56 may be more effective if the pet does not like to be restrained within the container 14 of the pet transporter 10. The side panels 44,46 and top covering 50 furthermore permit ventilation and/or visibility for the pet when transported within the pet transporter 10.

The pet transporter 10 is particularly useful when travel requires that a pet be transported by both pedestrian movement and by automobile, plane, or boat. In this respect, the pet preferably is placed within the container 14 when the trip begins. This likely would entail placing the pet inside the container 14 within the security of the home of the pet owner. The pet transporter 10 with the pet therein then may be rolled out to, for example, an automobile. The handle 16 then may be retracted, the wheel assemblies 18 retracted, and the pet transporter 10 lifted using the integral rear handle 32 and secured in placed on a passenger seat of the automobile with the passenger seat belt.

Once the destination is reached, the pet transporter 10 may be placed back on the ground with the wheel assemblies 18 extended and the handle 16 extended for further rolling of the pet transporter 10 to a safe environment for release of the pet. Alternatively, if the trip is to a veterinarian, then the pet may be left within the pet transporter 10 and may be seen by the veterinarian by merely lowering of the loading ramp 36 and rolling back of the top covering 50. If the leash restraint system 54,56 is utilized, the pet will be restrained from exiting the container 14 while the pet is examined. Moreover, if the wheel assemblies 18 are retracted, then the pet transporter 10 may be lifted and placed on an examination table without risk of the pet transporter 10 rolling off of the examination table.

An Alternative Illustrated Pet Transporter

Figure 8:
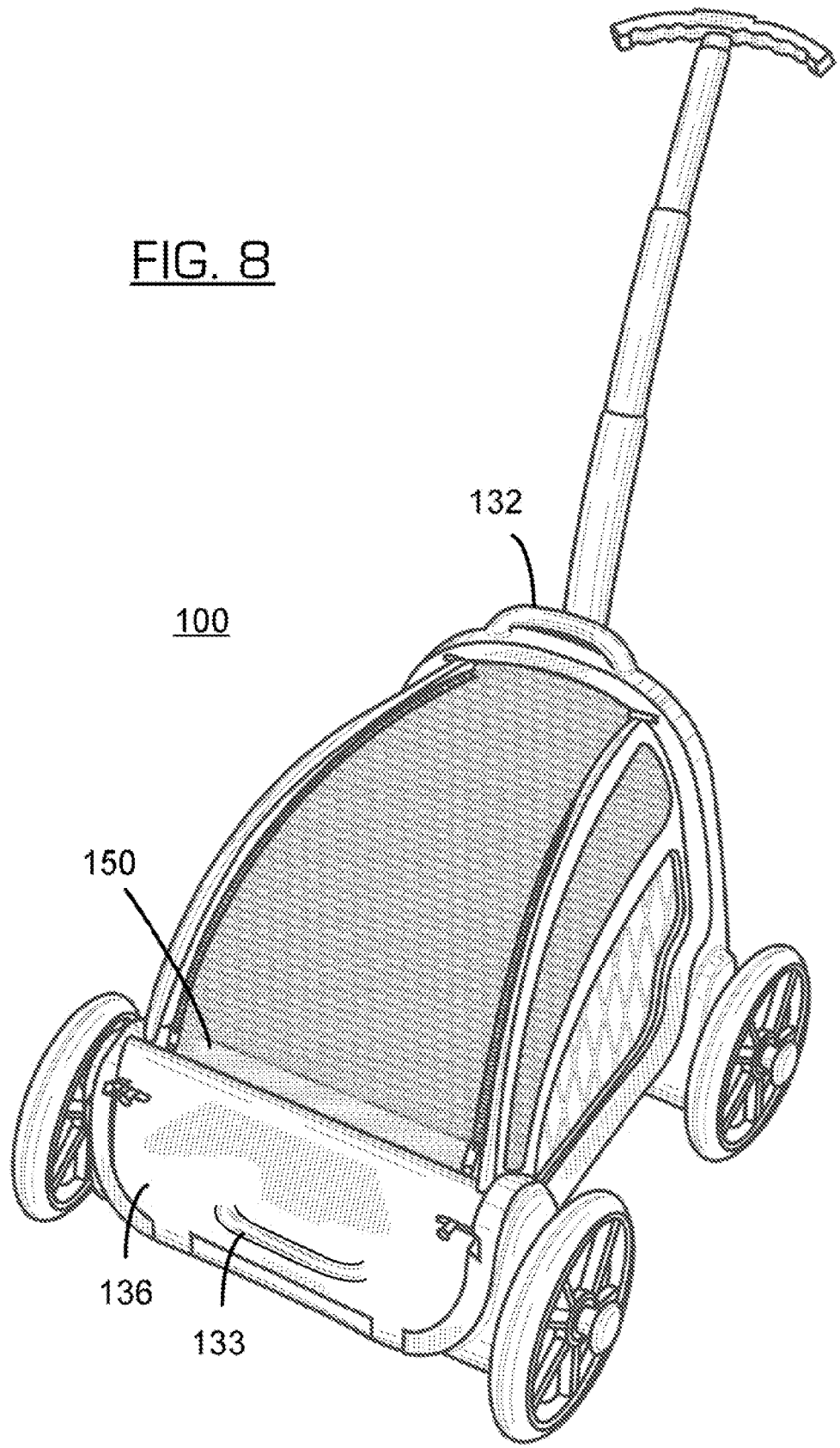
FIG. 8 is a perspective view of a front of a pet transporter similar to that of FIG. 1 but with two variations in accordance with another embodiment of the present invention.

An alternative pet transporter 100 is illustrated in FIG. 8 and is the same in design and construction to pet transporter 10 except for two variations. First, the pet transporter 100 includes a third handle 133 attached to the front loading ramp 136. Preferably, the third handle 133 is integrally formed with the front loading ramp 136 during a molding process. However, the third handle 133 may be adhered or otherwise attached to the front loading ramp 136. The front handle 133 is useful in conjunction with handle 132 when, for example, lifting of the pet transporter 100 is performed. This is particularly true when the pet is contained within the pet transporter 100 and the pet transporter 100 must be lifted for placement within an automobile.

The second variation in the pet transporter 100 is the complete extension of the top covering 150 down to the front loading ramp 136. In contrast, in the pet transporter 10 of FIG. 1, the top covering 50 does not extend completely to the front loading ramp 36 and thereby leaves a small gap between the front loading ramp 56 and the top covering 50. While the top covering 50 still completely encloses a pet within the container 14 in the pet transporter 10 of FIG. 1, the pet transporter 10 is not as particularly useful as the pet transporter 100 of FIG. 8 when used to transport a very small pet. Thus, a pet transporter should include a top covering that completely extends to the top of the front loading ramp when it is used to transport a very small pet.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A pet transporter, comprising:
   (a) a container defining an interior space dimensioned to receive a pet therein; and
   (b) wheel assemblies attached to said container, each said wheel assembly including a wheel for vehicular rolling of the container over a surface;
   (c) wherein said container comprises a chassis that includes:
      (i) a platform,
      (ii) a rear support frame extending upwardly from said platform, and
      (iii) two pairs of side support frames, each said pair located on a respective lateral side of said chassis, each said side support frame extending from said rear support frame of said chassis to a front portion of said platform,
      (iv) wherein said platform, said rear support frame, and said two pairs of side support frames comprise a single, inseparable structure;
   (d) wherein said interior space of said container is partially defined by a pair of side panels each attached to a respective lateral side of said chassis to enclose sides of said interior space, said interior space of said container being further partially defined by a flexible top covering when in a closed covering position, at least a portion of said flexible top covering sloping downwardly in extending from said rear support frame to proximate said, front portion of said platform; and
   (e) wherein said chassis including said respective pairs of said side support frames define openings that are covered by said side panels.

2. The pet transporter of claim 1, wherein a said side panel comprise apertures for ventilation and air circulation of said interior space of said container.

3. The pet transporter of claim 1, wherein a said side panel is stamped to include apertures therein for ventilation and air circulation of said interior space of said container.

4. The pet transporter of claim 1, wherein a said side panel comprises a mesh material and another said side panel comprises a lattice, wherein apertures of said lattice permit a pet to be viewed within the pet transporter and wherein apertures of said mesh material permit the pet to view the area outside of the pet transporter but do not permit the pet to be viewed within the pet transporter.

5. The pet transporter of claim 1, further comprising a loading ramp that is configured for pivotal movement between a raised position for enclosing a pet and a lowered position for entrance into and exit from said container by a pet, and wherein said loading ramp, when disposed in said lowered position, is disposed level with a floor of said container or below, and oriented at an incline to, said floor of said container.

6. The pet transporter of claim 1, wherein said loading ramp includes a handle for lifting of the pet transporter.

7. The pet transporter of claim 1, wherein said flexible top covering is releasably fastened to said chassis and which, when unfastened therefrom, is configured to be rolled-up into itself.

8. The pet transporter of claim 7, further comprising a fastener for securing said top covering in a rolled configuration on top of, and near the back of, said container.

9. The pet transporter of claim 7, wherein a side support frame on each side of the pet transporter includes a first zipper element; wherein said top covering includes correspondingly-located second zipper elements that mate with said first zipper elements; and wherein said top covering is configured, when unzipped, to be rolled-up into itself.

10. The pet transporter of claim 7, wherein said top covering includes elastic elements urging said flexible top covering to roll-up into itself.

11. The pet transporter of claim 7, wherein said top covering comprises a woven screen mesh material.

12. The pet transporter of claim 7, wherein said top covering comprises apertures for ventilation and air circulation of said interior space of said container.

13. The pet transporter of claim 1, wherein the pet transporter further comprises a telescoping handle that is attached to said container and, when extended, is configured to bow away from said container.

14. The pet transporter of claim 1, wherein each said wheel assembly is selectively detachable from said container independent of the detachment of any of the other said wheel assemblies; wherein each said wheel assembly includes a respective wheel and an axle, said wheel being rotatable about an axis of said axle, and said axle longitudinally extending through an opening of said container when said wheel assembly is attached to said container; and wherein each said wheel assembly further includes a spring component that urges said axle longitudinally through the opening of said container when said wheel assembly is attached to said container.

15. The pet transporter of claim 1, wherein each said wheel assembly comprises a self-contained assembly that includes a wheel and an axle.

16. The pet transporter of claim 1, wherein each said wheel assembly is configured to be selectively detached and reattached to said container between a retracted position, in which said wheel of said wheel assembly is not configured to engage the surface for vehicular rolling of said container, and an extended position, in which said wheel of said wheel assembly is configured to engage said surface for vehicular rolling of said container.

17. The pet transporter of claim 1, wherein a pair of said wheel assemblies respectively extend outwardly from opposite lateral sides of said container such that said container is disposed laterally between said wheels of said wheel assemblies.

18. A pet transporter, comprising:
(a) a container; and
(b) wheel assemblies attached to said container, each said wheel assembly including a wheel for vehicular rolling of the container over a surface;
(c) wherein said container comprises a chassis that includes:
  (i) a platform,
  (ii) a rear support frame extending upwardly from said platform, and
  (iii) two pairs of side support frames, each said pair located on a respective lateral side of said chassis, each said side support frame extending from said rear support frame of said chassis to a front portion of said platform,
  (iv) wherein said platform, said rear support frame, and said two pairs of side support frames comprise a single, inseparable structure and are integrally formed in one or more molding processes; and
(d) wherein said container further includes side panels that are integrally formed with said platform, said rear support frame, and said two pairs of side support frames in one or more molding processes, said container defining an interior space dimensioned to receive a pet therein, said interior space being partially defined by a flexible top covering when in a closed covering position, at least a portion of said flexible top covering sloping downwardly in extending from said rear support frame to proximate said front portion of said platform.

19. The pet transporter of claim 18, wherein each said wheel assembly is configured to be selectively detached and reattached to said container between a retracted position, in which said wheel of said wheel assembly is not configured to engage the surface for vehicular rolling of said container, and an extended position, in which said wheel of said wheel assembly is configured to engage said surface for vehicular rolling of said container; and wherein a pair of said wheel assemblies respectively extend outwardly from opposite lateral sides of said container such that said container is disposed laterally between said wheels of said wheel assemblies.

20. A pet transporter, comprising:
(a) a container defining an interior space dimensioned to receive a pet therein; and
(b) wheel assemblies attached to said container, each said wheel assembly including a wheel for vehicular rolling of the container over a surface;
(c) wherein said container comprises a chassis that includes:
  (i) a platform,
  (ii) a rear support frame extending upwardly from said platform, and
  (iii) two pairs of side support frames, each said pair located on a respective lateral side of said chassis, each said side support frame extending from said rear support frame of said chassis to a front portion of said platform,
  (iv) wherein said platform, said rear support frame, and said two pairs of side support frames comprise a single, inseparable structure and are integrally formed in one or more molding processes; and
(d) wherein said interior space of said container is partially defined by a pair of side panels each attached to a respective lateral side of said chassis to enclose sides of said interior space, said side panels being integrally formed with said chassis in one or more molding processes, and said interior space of said container is further partially defined by a flexible top covering when in a closed covering position, at least a portion said flexible top covering sloping downwardly in extending from said rear support frame to proximate said front portion of said platform; and
(e) wherein said chassis including said respective pairs of said side support frames define openings that are covered by said side panels.

* * * * *